United States Patent
Bates et al.

(10) Patent No.: US 9,600,156 B2
(45) Date of Patent: Mar. 21, 2017

(54) ENLARGING A SELECTION REGION ASSOCIATED WITH SELECTED INFORMATION IN A DOCUMENT DISPLAYED ON A SCREEN OF A COMPUTING DEVICE

(71) Applicant: International Business Machines Corporation, Armonk, NY (US)

(72) Inventors: Cary L. Bates, Rochester, MN (US); Megan D. Kostick, Edmonds, WA (US)

(73) Assignee: International Business Machines Corporation, Armonk, NY (US)

( * ) Notice: Subject to any disclaimer, the term of this patent is extended or adjusted under 35 U.S.C. 154(b) by 159 days.

(21) Appl. No.: 14/497,522

(22) Filed: Sep. 26, 2014

(65) Prior Publication Data

US 2016/0092017 A1    Mar. 31, 2016

(51) Int. Cl.
*G06F 3/0484* (2013.01)
*G06F 3/0485* (2013.01)
*G06F 3/0488* (2013.01)
*G06F 17/27* (2006.01)

(52) U.S. Cl.
CPC ........ *G06F 3/04842* (2013.01); *G06F 3/0485* (2013.01); *G06F 3/0488* (2013.01); *G06F 17/27* (2013.01); *G06F 2203/04806* (2013.01)

(58) Field of Classification Search
CPC .. G06F 3/0416; G06F 3/0412; G06F 3/04842; G06F 3/017; G06F 3/0485; G06F 2203/04806; G06F 2203/04808; G06F 2203/04805; G06F 2203/04101
USPC ................... 178/18.01–19.07; 345/173–178; 715/700–866
See application file for complete search history.

(56) References Cited

U.S. PATENT DOCUMENTS

2009/0100384 A1\* 4/2009 Louch ................... G06F 1/1626
                                                                      715/863
2010/0299592 A1   11/2010 Zalewski et al.
2013/0080890 A1    3/2013 Krishnamurthi

\* cited by examiner

*Primary Examiner* — Michael Pervan
(74) *Attorney, Agent, or Firm* — Francis Lammes; Stephen J. Walder, Jr.; Steven L. Bennett (57) ABSTRACT

A mechanism is provided for enhancing a selection region for select information associated within a document. A document is analyzed to determine one or more pieces of information in the document that are likely to be selected by the user, wherein the one or more pieces of information are less than all of the information in the document. Responsive to the document failing to have been analyzed before, a selection region associated with each piece of information in the one or more pieces of information is enlarged by a first predetermined size amount thereby forming a respective region enlargement value for each piece of information in the one or more pieces of information. The region enlargement value for each piece of information in the one or more pieces of information is then recorded.

17 Claims, 7 Drawing Sheets

ENLARGING A SELECTION REGION ASSOCIATED WITH SELECTED INFORMATION IN A DOCUMENT DISPLAYED ON A SCREEN OF A COMPUTING DEVICE

BACKGROUND

The present application relates generally to an improved data processing apparatus and method and more specifically to mechanisms for enlarging a selection region associated with selected information in a document displayed on a screen of a computing device.

A mobile device (also known as a handheld computer or simply handheld) is a small, handheld computing device, typically having a display screen with touch input and/or a miniature keyboard. A handheld computing device has an operating system (OS), and can run various types of application software, known as apps. Most handheld devices can also be equipped with Wi-Fi, Bluetooth, and Global Positioning System (GPS) capabilities that allow connections to the Internet and other Bluetooth-capable devices, such as an automobile or a microphone headset. Lately, early pocket-sized mobile devices have been joined by larger but otherwise similar tablet computers. Much like in a personal digital assistant (PDA), the input and output of modern mobile devices are often combined into a touch-screen interface. Smartphones, tablets, and the like are popular amongst individuals who wish to use some of the powers of a conventional computer in environments where carrying a conventional computer would not be practical.

SUMMARY

In one illustrative embodiment, a method, in a data processing system, is provided for enhancing a selection region for select information associated within a document. The illustrative embodiment analyzes a document to determine one or more pieces of information in the document that are likely to be selected by the user, wherein the one or more pieces of information are less than all of the information in the document. The illustrative embodiment enlarges the selection region associated with each piece of information in the one or more pieces of information by a first predetermined size amount thereby forming a respective region enlargement value for each piece of information in the one or more pieces of information in response to the document failing to have been analyzed before. The illustrative embodiment records the region enlargement value for each piece of information in the one or more pieces of information.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings.

DETAILED DESCRIPTION

Mobile devices, such as smartphones, tablets, and the like, are popular amongst individuals who wish to use some of the powers of a conventional computer in environments where carrying a conventional computer would not be practical. Many mobile devices are used by professionals who, when they are away from the office, want to or need to stay connected to their company business, such as an information technology (IT) professional who is required to be on-call. In accordance with the illustrative embodiments, on-call means that the professional is required to perform their professional trade while they are out of the office, such as after normal working hours during the work week, on weekends, on holidays, or even while on vacation. Thus, mobile devices provide professionals with means to stay connected while they are out of the office. Because of needing to or wanting to stay connected to their office, there is often a need to quickly identify what issues need to be addressed so that the on-call professional may continue with whatever they were doing prior to being called.

For example, in the case of an IT professional, when the IT professional is called to handle an issue with an application, the IT professional may want to quickly identify an issue with a particular piece of code, occurrences of a failing module within a larger section of code, or occurrences of a particular variable within a section of code for the application. As another example, when a project manager is called with an issue in scheduling, the project manager may want to identify a particular contractor, a set of contractors associated with a sub-portion of a project, or events that are to occur on a particular date. While conventional computers may be able to perform such tasks, mobile devices are limited when, for example, a professional needs to view a large amount of source code and display variable values by selecting a variable from the source code being displayed. On a tablet, this means a user needs to touch a variable, but due to finger size and the small screen, it is often hard to "hit" or "select" the variable the user intended. This usually results in several tries before the user finally selects the correct variable and even more problems when the user does not notice they are viewing the wrong variable.

Thus, the illustrative embodiments provide for enlarging a selection region associated with each of one or more selected pieces of information, i.e. the area around each of the one or more pieces of information, in a document displayed on a screen of a computing device. While the following embodiments described herein are described with regard to a touch screen that is comprised of a display and a touch input, other types of screens may also be utilized that are comprised of a display and, for example, a mouse, track ball, or the like. Based on one or more predefined associations with the user of a client device with which the touch screen is associated, the illustrative embodiments improve the selection region associated with the one or more pieces of information within the document, where the one or more pieces of information are from a subset of information that is less than all of the information in the document. For example, if the user has previously selected a piece or portion of the document in a previous viewing of the document, then the illustrative embodiments may enlarge a selection region associated with the previous one or more pieces or portions of the document that are displayed on the touch screen of the computing device and/or are to be displayed on the touch screen of the computing device. Further, based on previously selected portions of other documents, the illustrative embodiments may identify syntax or semantic portions of the current document associated with the previously selected portions of other documents in order to improve the selection region associated with one or more pieces or portions of the document that are displayed on the touch screen of the computing device and/or are to be displayed on the touch screen of the computing device.

Additionally, if a user stops at a certain location within the document, the illustrative embodiments may identify syntax or semantics associated with the displayed portion of the document in order to improve the selection region associated with one or more pieces of information associated with the displayed portion of the document. Further, based on the identified one or more pieces of information associated with the displayed portion of the document, the illustrative embodiments may proceed to enlarge the selection region of information not displayed in the display on the touch screen of the computing device but associated with the one or more pieces of information associated with the displayed portion of the document. That is, the illustrative embodiments track selection region enlargements and may apply the enlargement of the selection region to all selection regions associated with information associated with previously or currently identified information.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a," "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of the examples provided herein without departing from the spirit and scope of the present invention.

Figure 1:
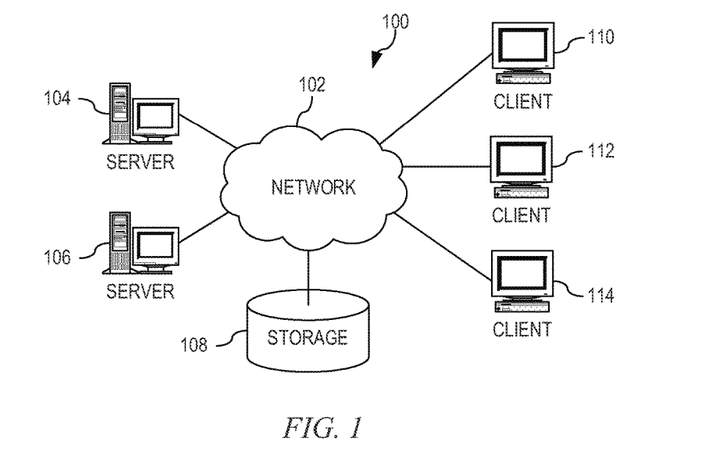
FIG. 1 is an example diagram of a distributed data processing system in which aspects of the illustrative embodiments may be implemented.
Figure 2:
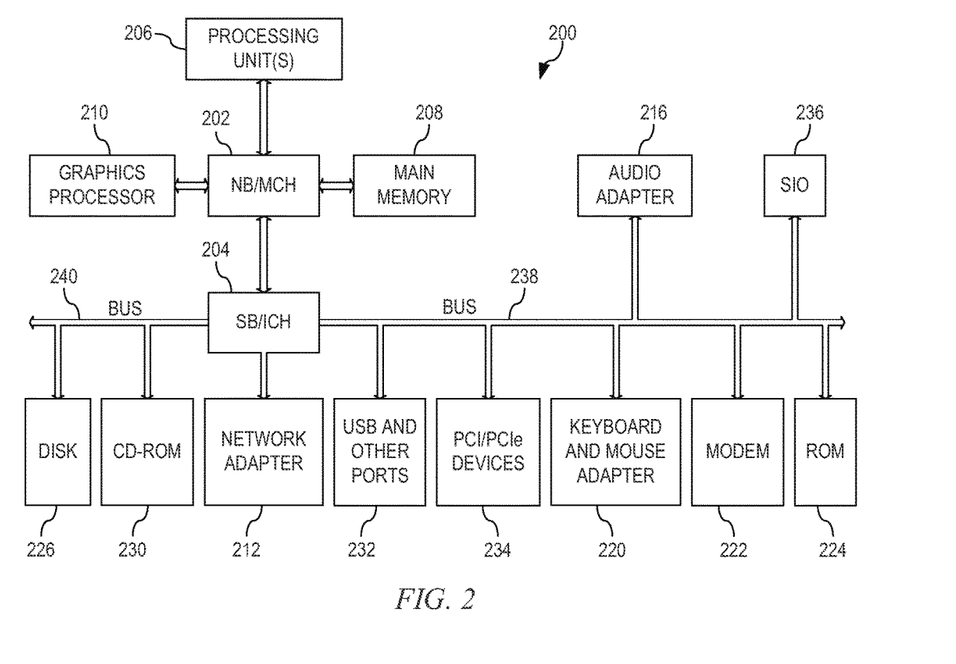
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments. FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, the distributed data processing system 100 may also be implemented to include a number of different types of networks, such as for example, intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System P® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system previously mentioned, without departing from the spirit and scope of the present invention.

Moreover, the data processing, system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
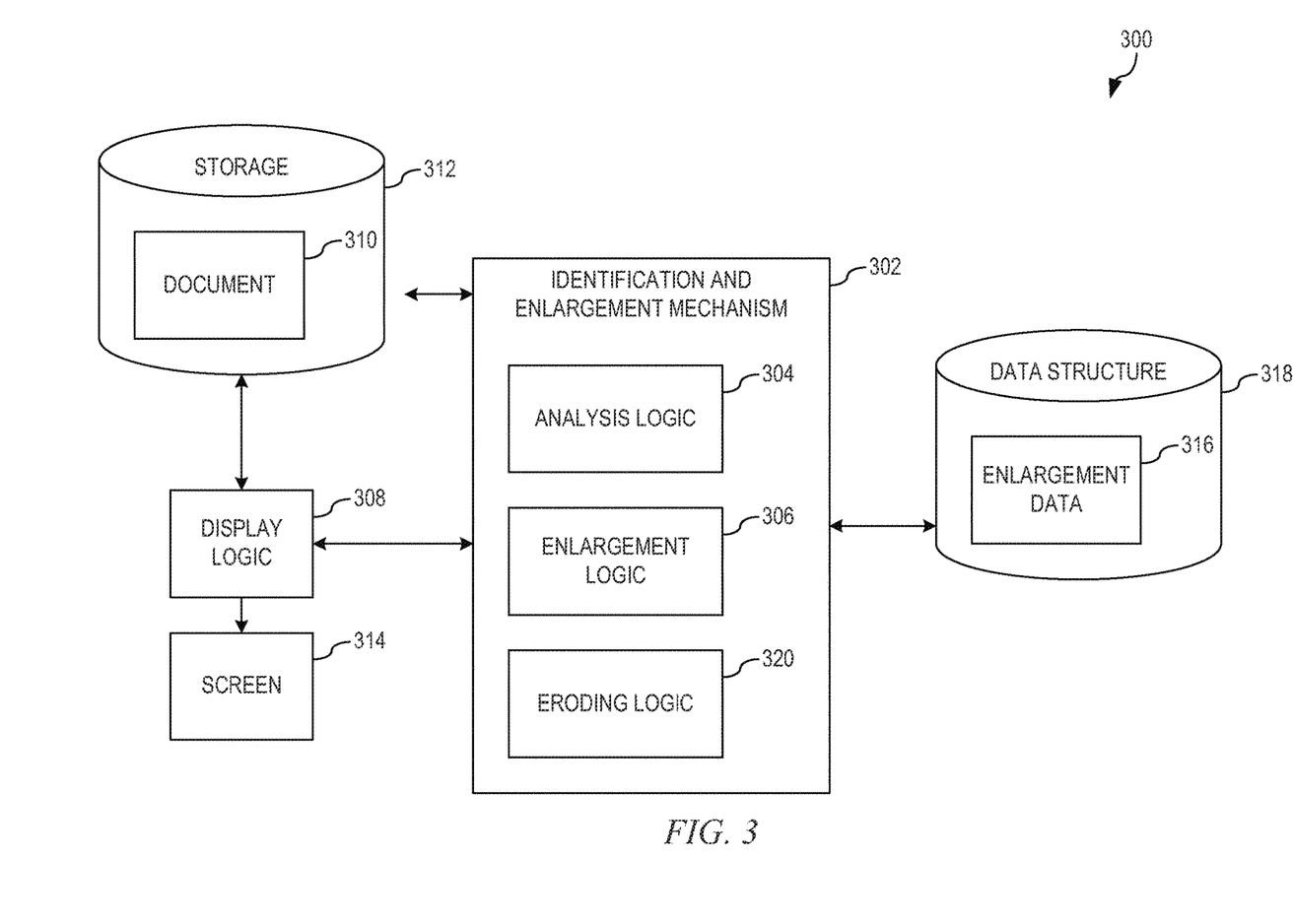
FIG. 3 depicts a functional block diagram of such an identification and enlargement mechanism in accordance with an illustrative embodiment.

In order to improve a selection region associated with an identified one or more pieces of information in a document, the illustrative embodiments provide an identification and enlargement mechanism that identifies one or more selected pieces of information in a document based on predetermined criteria and enlarges a selected region associated with the identified one or more pieces of information in the document. FIG. 3 depicts a functional block diagram of such an identification and enlargement mechanism in accordance with an illustrative embodiment. The functional block diagram of FIG. 3 may be implemented, for example, by one or more of the computing devices illustrated in FIG. 1 and/or data processing system 200 of FIG. 2. Identification and enlargement mechanism 302, which is comprised within data processing system 300, may operate on each document that is displayed on the touch screen of data processing system 300 that is viewed by a user or may operate on a subset of documents that are displayed on the touch screen of the computing device that is viewed by the user based on user settings that are predetermined by the user. Accordingly, in the illustrative embodiment, identification and enlargement mechanism 302 comprises analysis logic 304 and enlargement logic 306, which work in conjunction with display logic 308. In operation, when document 310 that is stored in storage 312 is to be viewed by a user, display logic 308 displays document 310 on touch screen 314 of data processing system 300.

Based on user settings indicating that identification and enlargement mechanism 302 is to be utilized, prior to presenting document 310 on touch screen 314 or while document 310 is presented on touch screen 314, analysis logic 304 analyzes document 310 to determine one or more pieces of information within a subset of information in document 310 that are likely to be selected by the user. In accordance with the illustrative embodiment, the one or more pieces of information are from a subset of information that is less than all of the information in document 310.

In analyzing document 310 to identify the one or more pieces of information, analysis logic 304 may utilize numerous inputs to identify one or more pieces of information that are likely to be selected by the user, such as historical accesses to the same or similar pieces of information in the same document or another document, syntax or semantic identification of the one or more pieces of information associated with the displayed portion of the document, syntax or semantic identification of the one or more pieces of information associated with the entire document, one or more pieces of information associated with a location in a document where a program executing the document paused or as indicated by metadata associated with the pause or failure, or similar inputs.

In one embodiment, in an analysis of document 310 using historical accesses, analysis logic 304 determines whether there is historical information associated with document 310 or similar documents stored in enlargement data 316 in data structure 318. With regard to the user of historical information associated with the similar documents, the illustrative embodiments recognize the similar documents to be, for example, prior or subsequent versions of document 310. Responsive to analysis logic 304 determining that historical information exists for document 310 or similar documents, analysis logic 304 provides an indication of the one or more identified pieces of information in document 310 to enlargement logic 306. Based on the identification of the one or more identified pieces of information in document 310, enlargement logic 306 enlarges a selection region associated with each piece of information in the one or more identified pieces of information by a region enlargement value identified in enlargement data associated with that piece of information. It is noted that since the piece of information has been identified previously within the same document or a similar document, enlargement data 316 includes a region enlargement value associated with the piece of information. The region enlargement value indicates a value of region enlargement that is to be utilized for the piece of information. For example, if a region enlargement value indicates 2× (two times), then enlargement logic 306 enlarges the selection region associated with that piece of information by two times. As another example, if a particular piece of information does not indicate a region enlargement value, then enlargement logic 306 enlarges the selection region associated with that piece of information by the first predetermined size. One reason for a particular piece of information to not have a region enlargement value is due to an eroding process that is performed by identification and enlargement mechanism 302 when a document is closed, as will be described in detail below. Once enlargement logic 306 enlarges the selection region associated with that piece of information by the additional first predetermined size, enlargement logic 306 records the new region enlargement value for that piece of information in enlargement data 316.

In a second embodiment, in an analysis of document 310 using syntax or semantic identification of the one or more pieces of information associated with a displayed portion of the document or associated with the entire document, analysis logic 304 may use syntax or semantic analysis to identify one or more pieces of information with a highest priority, where the priority of a particular piece of information is predetermined by the user. For example, if the one or more pieces of information are variables within a program code document and the user has indicated to grow an "A" variable by two times and a "B" variable by three times, then using syntax or semantic analysis, analysis logic 304 may identify all occurrences of the "A" variable and the "B" variable either in the displayed portion of the document or the entire document, depending on which embodiment is being implemented, and enlargement logic 306 enlarges the selection region associated with that piece of information according to the predetermined enlargement value. Once enlargement logic 306 enlarges the selection region associated with that piece of information by the additional first predetermined size, enlargement logic 306 records the new region enlargement value for that piece of information in enlargement data 316.

In a third embodiment, in an analysis of document 310 to identify one or more pieces of information associated with a location in document 310 where a program executing the document paused or failed as indicated by metadata associated with the pause or failure, analysis logic 304 utilizes metadata associated with the pause or failure generated by the executing program to identify one or more pieces of information, such as a routine, a variable, a call, or the like, that caused the pause or failure or indicates allocation of the pause or failure. For example, if the one or more pieces of information is a call to a routine that did not execute properly and caused the program to hang, then analysis logic 304 may identify the call and the called routine in document 310 and enlargement logic 306 enlarges the selection region associated with the call and the called routine by the first predetermined size. Once enlargement logic 306 enlarges the selection region associated with that piece of information by the additional first predetermined size, enlargement logic 306 records the new region enlargement value for that piece of information in enlargement data 316.

Regardless of which embodiment is implemented by analysis logic 304 and enlargement logic 306, when the user has completed working with document 310 such that the user closes document 310, eroding logic 320 in identification and enlargement mechanism 302 performs an eroding process whereby each region enlargement value in enlargement data 316 associated with the identified one or more pieces of information within document 310 is eroded by a predetermined eroding amount. For example, if a region enlargement value associated with an existing piece of information was increased from two times to three times during the analysis of document 310, then, when document 310 is closed, eroding logic 320 erodes the region enlargement value to two times, as an example. However, if a region enlargement value associated with an existing piece of information was not increased because that particular piece of information was not displayed in the viewing window as described in the second embodiment, then, when document 310 is closed, eroding logic 320 erodes the region enlargement value to one time, as an example.

Figure 4:
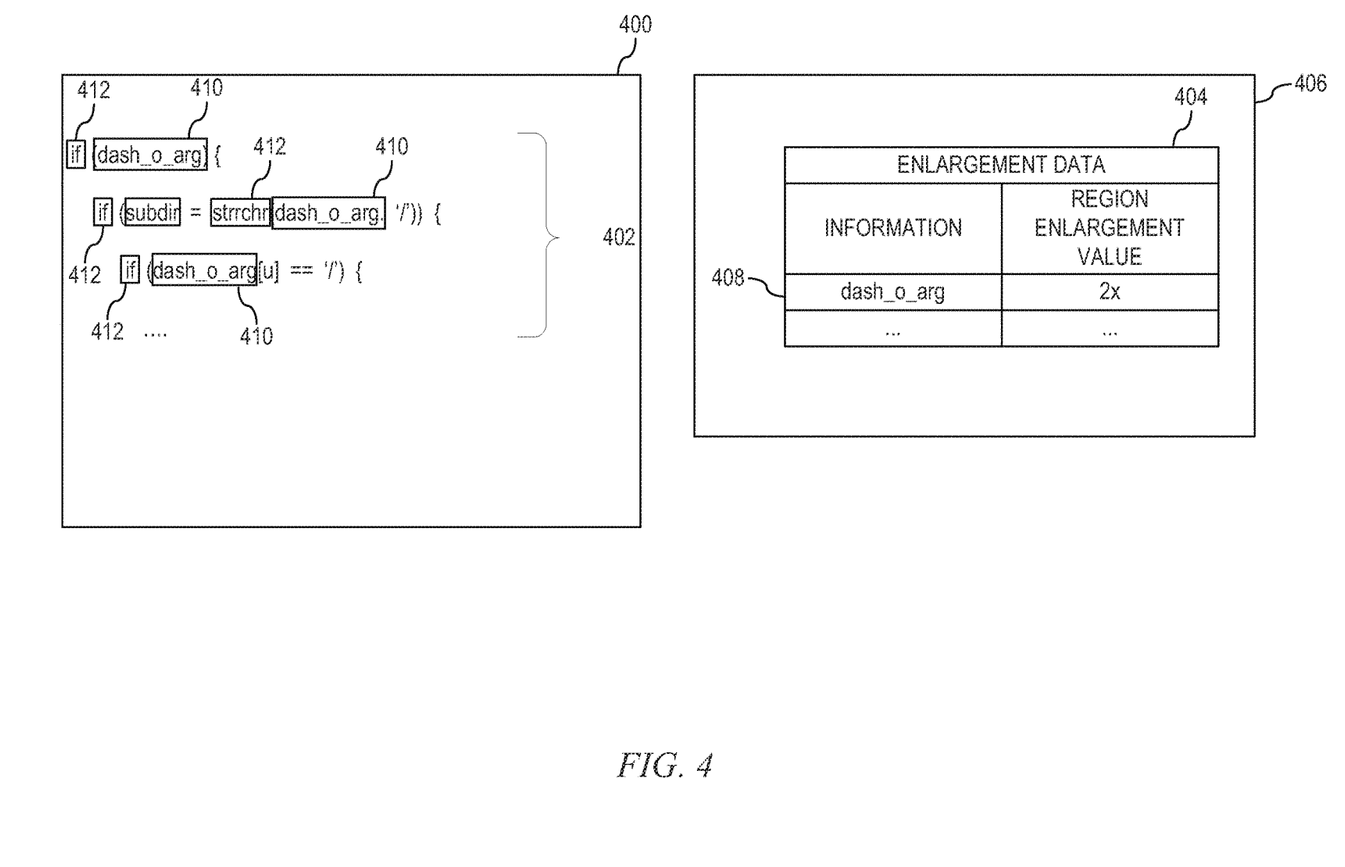
FIG. 4 depicts an exemplary document with enlarged selection regions in accordance with an illustrative embodiment.

In order to illustrate an example of improving a selection region associated with an identified one or more pieces of information in a document, FIG. 4 depicts an exemplary document with enlarged selection regions in accordance with an illustrative embodiment. Screen 400 depicts a portion of a code document 402 with three lines of code. In analysis of document 402, the analysis logic refers to enlargement data 404 in data structure 406 and identifies variable 'dash_o_arg' 408 as being a piece of information that has been previously selected by the user, identified through syntax or semantic analysis, displayed in a scroll stopped section of document 406, a cause of a previous pause in a program executing document 406, or the like. Responsive to the analysis logic determining that variable 'dash_$o_{13}$ arg' 408 as a piece of information that needs to have its associated selection region enlarged, the analysis logic provides an indication of variable 'dash_o_arg' 408 in document 402 to the enlargement logic. The enlargement logic then enlarges the selection region associated by the region enlargement value associated with variable 'dash_o_arg' 408 as identified from enlargement data 404. As shown, selection region 410 associated with each occurrence of variable 'dash_o_arg' 408 is larger than the selection region 412 of any other piece of information in screen 400. That is, the selection region is twice as large around variable 'dash_o_arg' 408 as compared to the selection region 412 of any other piece of information in screen 400.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 5:
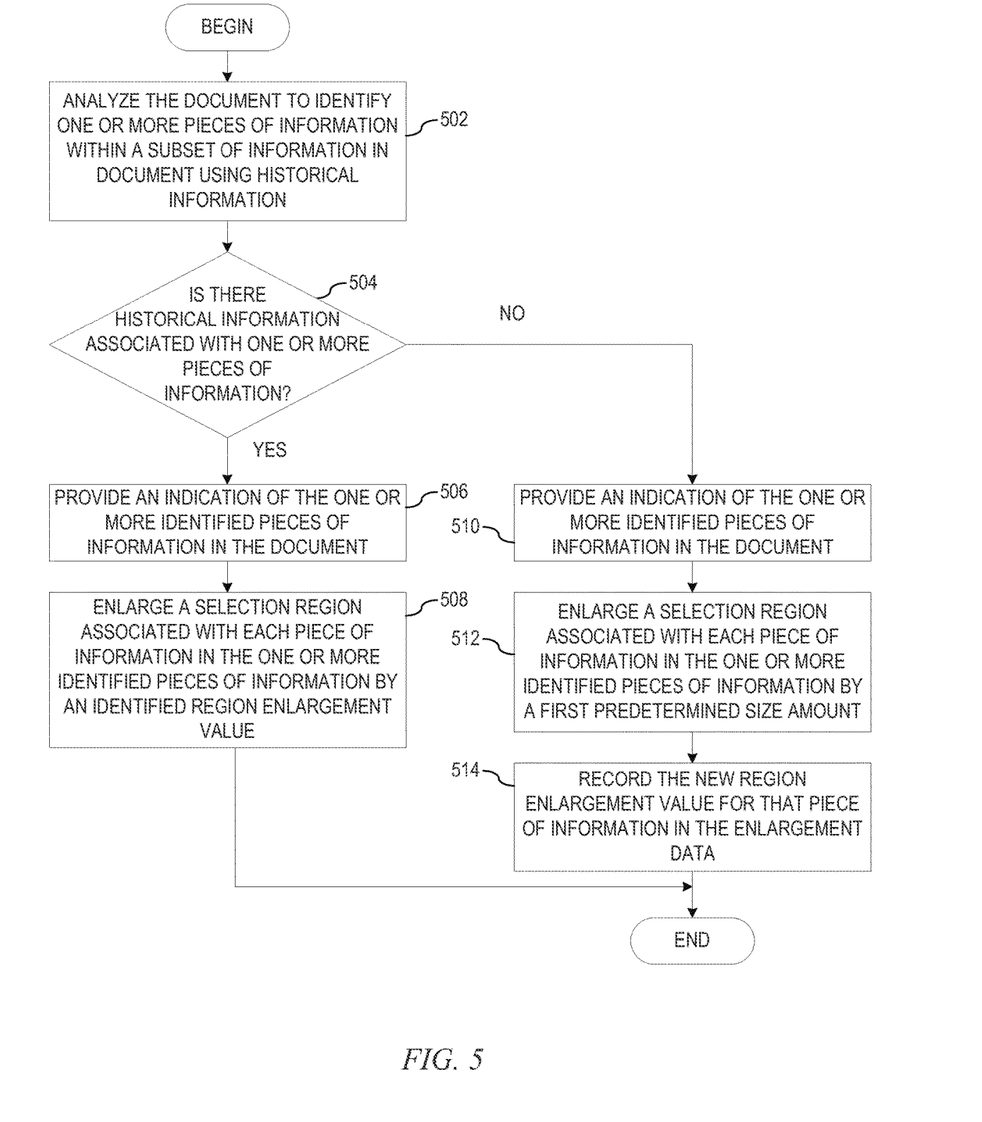
FIG. 5 depicts a flow diagram of the operation performed by an identification and enlargement mechanism utilizing historical information in accordance with an illustrative embodiment.

FIG. 5 depicts a flow diagram of the operation performed by an identification and enlargement mechanism utilizing historical information in accordance with an illustrative embodiment. As the operation begins and a document is either displayed or is about to be displayed in a screen of a data processing system and user settings indicate that the identification and enlargement mechanism is to be utilized, analysis logic of the identification and enlargement mechanism analyzes the document to identify one or more pieces of information within a subset of information in the document (step 502). For the one or more identified pieces of information, the analysis logic then determines whether there is historical information associated with one or more pieces of information in the document or one or more pieces of information in similar documents stored in enlargement data in a data structure (step 504). If at step 504 the analysis logic determines that historical information exists for the one or more pieces of information in the document or similar documents, the analysis logic provides an indication of the one or more identified pieces of information in the document to enlargement logic in the identification and enlargement mechanism (step 506). Based on the identification of the one or more identified pieces of information in the document, the enlargement logic enlarges a selection region associated with each piece of information in the one or more identified pieces of information by a region enlargement value identified in enlargement data associated with that piece of information (step 508), with the operation ending thereafter.

If at step 504 the analysis logic determines that no historical information exists for the one or more pieces of information in the document or similar documents, the analysis logic provides an indication of the one or more identified pieces of information in the document to enlargement logic in the identification and enlargement mechanism (step 510). The enlargement logic enlarges a selection region associated with each piece of information in the one or more identified pieces of information by a first predetermined size amount thereby forming an enlarged selection area for the piece of information which is then associated with the piece of information (step 512). Once the enlargement logic enlarges the selection region associated with that piece of information by the first predetermined size, the enlargement logic records the new region enlargement value for that piece of information in the enlargement data (step 514), with the operation ending thereafter.

Figure 6:
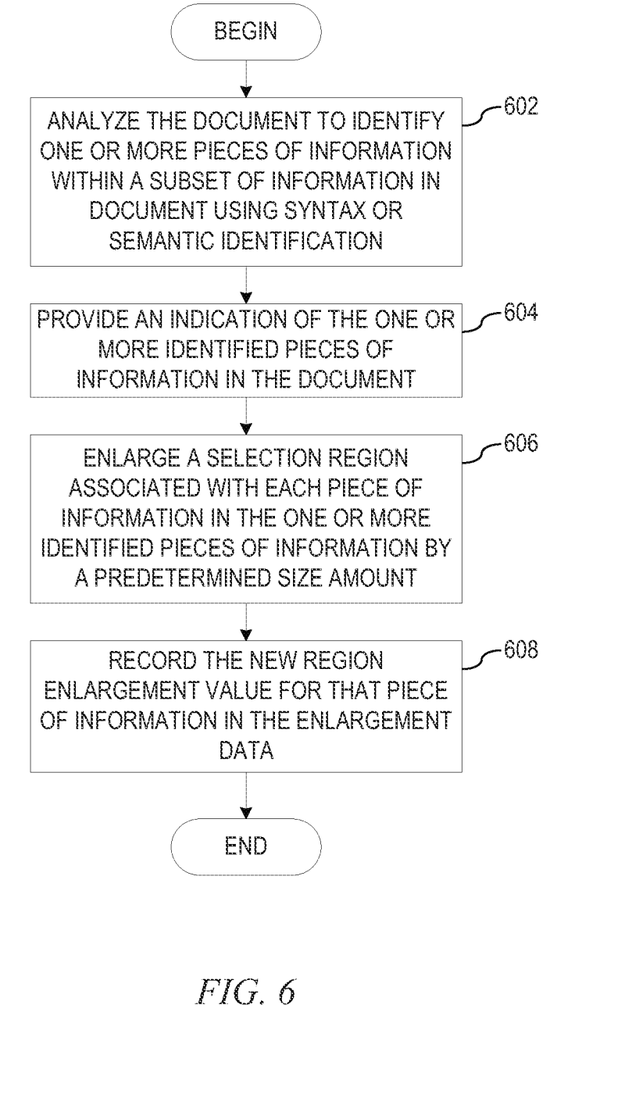
FIG. 6 depicts a flow diagram of the operation performed by an identification and enlargement mechanism utilizing syntax or semantic identification in accordance with an illustrative embodiment.

FIG. 6 depicts a flow diagram of the operation performed by an identification and enlargement mechanism utilizing syntax or semantic identification in accordance with an illustrative embodiment. As the operation begins and a document is either displayed or is about to be displayed in a screen of a data processing system and user settings indicate that the identification and enlargement mechanism is to be utilized, analysis logic of the identification and enlargement mechanism analyzes the document to identify one or more pieces of information using syntax or semantic identification with a displayed portion of the document or associated with the entire document (step 602). The particular syntactic or semantic algorithm that is utilized to identify the one or more pieces of information may be predefined by the user, where the algorithm utilizes a priority or set of variables, names, locations, job descriptions, dates, or whatever basis the user wants the analysis logic to use in identifying the one or more pieces of information.

For the one or more identified pieces of information, the analysis logic provides an indication of the one or more identified pieces of information in the document to enlargement logic in the identification and enlargement mechanism (step 604). Based on the identification of the one or more identified pieces of information in the document, the enlargement logic enlarges the selection region associated with each piece of information according to a predetermined enlargement value (step 606). The predetermined enlargement value may be identified by the user and may be based on the particular algorithm implemented by the user through the analysis logic. Once the enlargement logic enlarges the selection region associated with that piece of information by the predetermined enlargement value, the enlargement logic records the new region enlargement value for that piece of information in the enlargement data (step 608), with the operation ending thereafter.

Figure 7:
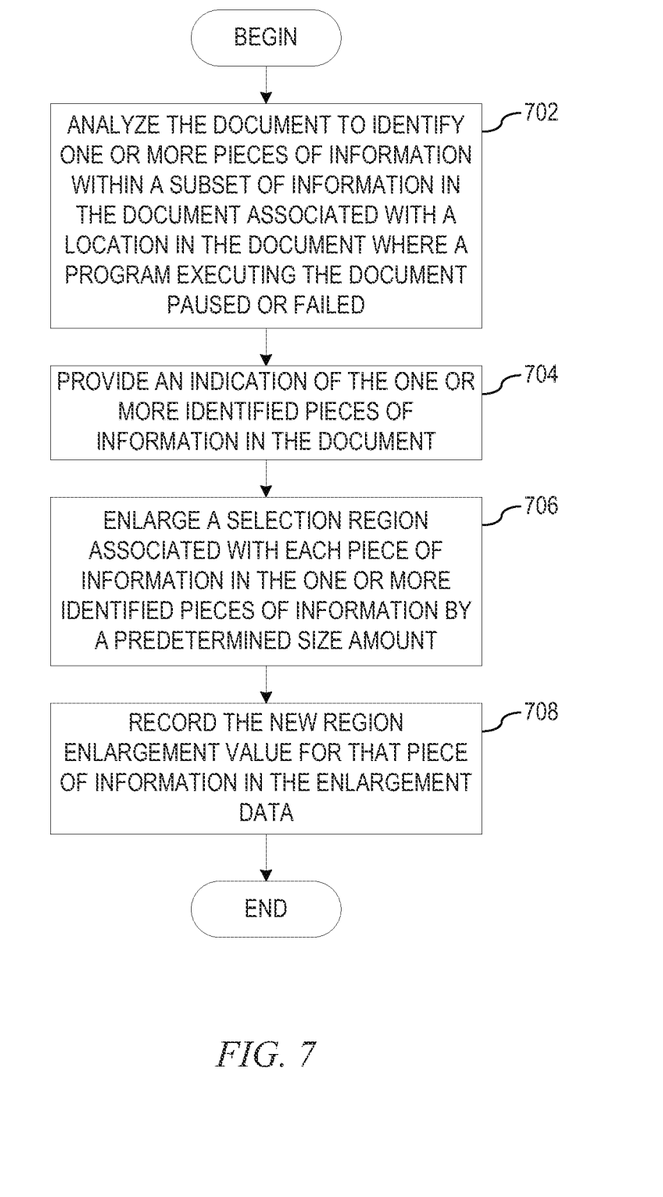
FIG. 7 depicts a flow diagram of the operation performed by an identification and enlargement mechanism utilizing location information in accordance with an illustrative embodiment.

FIG. 7 depicts a flow diagram of the operation performed by an identification and enlargement mechanism utilizing location information in accordance with an illustrative embodiment. As the operation begins and a document is either displayed or is about to be displayed in a screen of a data processing system and user settings indicate that the identification and enlargement mechanism is to be utilized, analysis logic of the identification and enlargement mechanism analyzes the document to identify one or more pieces of information associated with a location in the document where a program executing the document paused or failed as indicated by metadata associated with the pause or failure (step 702). In performing the analysis, the analysis logic may utilize metadata associated with the pause or failure generated by the executing program to identify one or more pieces of information, such as a routine, a variable, a call, or the like, that caused the pause or failure or indicates allocation of the pause or failure.

For the one or more identified pieces of information, the analysis logic provides an indication of the one or more identified pieces of information in the document to enlargement logic in the identification and enlargement mechanism (step 704). Based on the identification of the one or more identified pieces of information in the document, the enlargement logic enlarges the selection region associated with each piece of information according to a predetermined enlargement value (step 706). The predetermined enlargement value may be identified by the user and may be based on the particular algorithm implemented by the user through the analysis logic. Once the enlargement logic enlarges the selection region associated with that piece of information by the predetermined enlargement value, the enlargement logic records the new region enlargement value for that piece of information in the enlargement data (step 708), with the operation ending thereafter.

It is noted that the operations shown in FIG. 5-7 may operate independently or in combination with one another. However, regardless of which embodiment is implemented by the identification and enlargement mechanism, when the user has completed working with a document such that the user closes the document, eroding logic in identification and enlargement mechanism performs an eroding process whereby each region enlargement value in the enlargement data associated with the identified one or more pieces of information within the document is eroded by a predetermined eroding amount.

Figure 8:
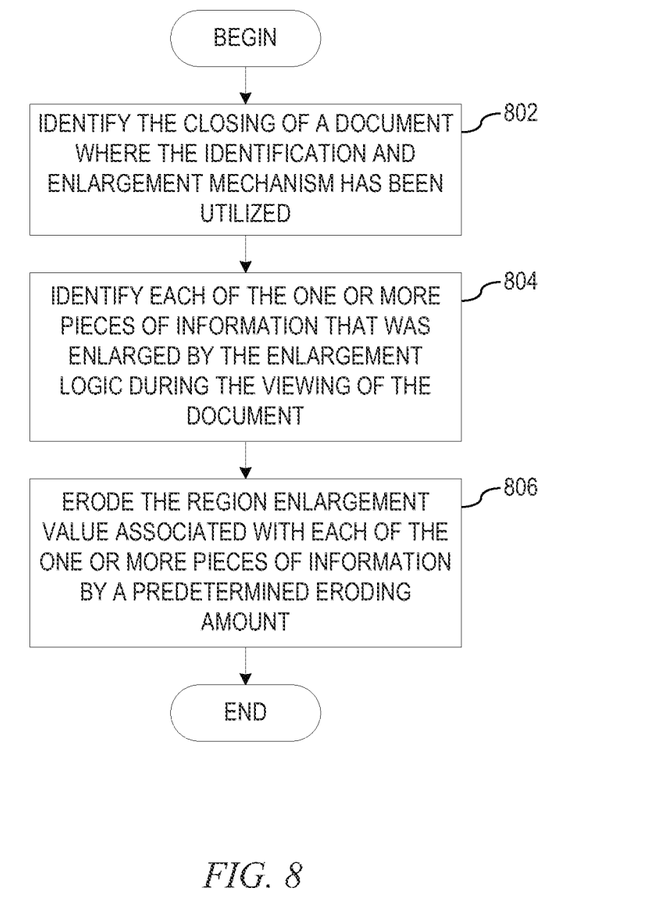
FIG. 8 depicts a flow diagram of the operation performed by an identification and enlargement mechanism eroding region enlargement value in accordance with an illustrative embodiment.

FIG. 8 depicts a flow diagram of the operation performed by an identification and enlargement mechanism eroding region enlargement value accordance with an illustrative embodiment. As the operation begins, eroding logic in identification and enlargement mechanism identifies the closing of a document where the identification and enlargement mechanism has been utilized (step 802). Upon identification of the closing of the document, the eroding mechanism identifies each of the one or more pieces of information that was enlarged by the enlargement logic, during the viewing of the document (step 804). That is, each time the enlargement logic enlarges a particular piece of information, the enlargement logic may notify the eroding logic of the enlargement such that when the document is closed, the eroding logic has an identification of each enlarged piece of information. After each piece of information has been identified, the eroding logic erodes the region enlargement value associated with each of the one or more pieces of information by a predetermined eroding amount (step 806), with the operation ending thereafter.

The flowchart and block diagrams in the figures illustrate the architecture, functionality, and operation of possible implementations of systems, methods, and computer program products according to various embodiments of the present invention. In this regard, each block in the flowchart, or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, the illustrative embodiments provide mechanisms for enlarging a selection region associated with each of one or more selected pieces of information, i.e. the area around each of the one or more pieces of information, in a document displayed on a screen of a computing device. Based on one or more predefined associations with the user of a client device with which the touch screen is associated, the illustrative embodiments improve the selection region associated with the one or more pieces of information within the document, where the one or more pieces of information are from a subset of information that is less than all of the information in the document.

As noted above, it should be appreciated that the illustrative embodiments may take the form of an entirety hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices Including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, for enhancing a selection region for select information associated within a document, the method comprising:

analyzing, by a processing unit in the data processing system, a document to determine one or more pieces of information in the document that are likely to be selected by the user, wherein the one or more pieces of information are less than all of the information in the document;

responsive to the document failing to have been analyzed before, enlarging, by the processing unit, the selection region associated with each piece of information in the one or more pieces of information by a first predetermined size amount thereby forming a respective region enlargement value for each piece of information in the one or more pieces of information;

recording, by the processing unit, the region enlargement value for each piece of information in the one or more pieces of information;

responsive to the user stopping a scrolling of the document for greater than a predetermined time period, further enlarging, by the processing unit, the selection region associated with each piece of information of the one or more pieces of information currently displayed on the screen by a second predetermined size amount thereby forming a new region enlargement value for each piece of information of the one or more pieces of information currently displayed on the screen; and recording, by the processing unit, the new region enlargement value for each piece of information of the one or more pieces of information currently displayed on the screen.

2. The method of claim 1, further comprising:
responsive to the document having been analyzed before, enlarging, by the processing unit, the selection region associated with each piece of information in the one or more pieces of information by a previous region enlargement value associated with that piece of information.

3. The method of claim 1, further comprising:
responsive to the document being paused by a program executing the document, further enlarging, by the processing unit, the selection region associated with each piece of information of the one or more pieces of information during analysis of the document by a third predetermined size amount thereby forming a new region enlargement value for each piece of information of the one or more pieces of information identified during the analysis of the document; and recording, by the processing unit, the new region enlargement value for each piece of information of the one or more pieces of information identified during the analysis of the document.

4. The method of claim 1, further comprising:
further enlarging, by the processing unit, the selection region associated with each piece of information of the one or more pieces of information not currently displayed on the screen and associated with each piece of information of the one or more pieces of information currently displayed on the screen by the second predetermined size amount thereby forming a new region enlargement value for each piece of information of the one or more pieces of information not currently displayed on the screen and associated with each piece of information of the one or more pieces of information currently displayed on the screen; and recording, by the processing unit, the new region enlargement value for each piece of information of the one or more pieces of information not currently displayed on the screen.

5. The method of claim 1, further comprising:
responsive to the document being closed, eroding, by the processing unit, the region enlargement value associated with each piece of information of the one or more pieces of information by a predetermined eroding amount.

6. The method of claim 1, wherein the selection region is a touch region of a touch screen.

7. A computer program product comprising a computer readable storage medium having a computer readable program stored therein, wherein the computer readable program, when executed on a computing device, causes the computing device to:
analyze a document to determine one or more pieces of information in the document that are likely to be selected by the user, wherein the one or more pieces of information are less than all of the information in the document;

responsive to the document failing to have been analyzed before, enlarge a selection region associated with each piece of information in the one or more pieces of information by a first predetermined size amount thereby forming a respective region enlargement value for each piece of information in the one or more pieces of information; and record the region enlargement value for each piece of information in the one or more pieces of information;

responsive to the user stopping a scrolling of the document for greater than a predetermined time period, further enlarge the selection region associated with each piece of information of the one or more pieces of information currently displayed on the screen by a second predetermined size amount thereby forming a new region enlargement value for each piece of information of the one or more pieces of information currently displayed on the screen; and record the new region enlargement value for each piece of information of the one or more pieces of information currently displayed on the screen.

8. The computer program product of claim 7, wherein the computer readable program further causes the computing device to:
responsive to the document having been analyzed before, enlarge the selection region associated with each piece of information in the one or more pieces of information by a previous region enlargement value associated with that piece of information.

9. The computer program product of claim 7, wherein the computer readable program further causes the computing device to:
responsive to the document being paused by a program executing the document, further enlarge the selection region associated with each piece of information of the one or more pieces of information during analysis of the document by a third predetermined size amount thereby forming a new region enlargement value for each piece of information of the one or more pieces of information identified during the analysis of the document; and record the new region enlargement value for each piece of information of the one or more pieces of information identified during the analysis of the document.

10. The computer program product of claim 7, wherein the computer readable program further causes the computing device to:
further enlarge the selection region associated with each piece of information of the one or more pieces of information not currently displayed on the screen and associated with each piece of information of the one or more pieces of information currently displayed on the screen by the second predetermined size amount thereby forming a new region enlargement value for each piece of information of the one or more pieces of information not currently displayed on the screen and associated with each piece of information of the one or more pieces of information currently displayed on the screen; and record the new region enlargement value for each piece of information of the one or more pieces of information not currently displayed on the screen.

11. The computer program product of claim 7, wherein the computer readable program further causes the computing device to:
responsive to the document being closed, erode the region enlargement value associated with each piece of information of the one or more pieces of information by a predetermined eroding amount.

12. The computer program product of claim 7, wherein the selection region is a touch region of a touch screen.

13. An apparatus comprising:
a processing unit; and
a memory coupled to the processing unit, wherein the memory comprises instructions which, when executed by the processing unit, cause the processing unit to:
analyze a document to determine one or more pieces of information in the document that are likely to be selected by the user, wherein the one or more pieces of information are less than all of the information in the document;
responsive to the document failing to have been analyzed before, enlarge a selection region associated with each piece of information in the one or more pieces of information by a first predetermined size amount thereby forming a respective region enlargement value for each piece of information in the one or more pieces of information;
record the region enlargement value for each piece of information in the one or more pieces of information;
responsive to the user stopping a scrolling of the document for greater than a predetermined time period, further enlarge the selection region associated with each piece of information of the one or more pieces of information currently displayed on the screen by a third predetermined size amount thereby forming a new region enlargement value for each piece of information of the one or more pieces of information currently displayed on the screen; and
record the new region enlargement value for each piece of information of the one or more pieces of information currently displayed on the screen.

14. The apparatus of claim 13, wherein the instructions further cause the processing unit to:
responsive to the document having been analyzed before, enlarge the selection region associated with each piece of information in the one or more pieces of information by a previous region enlargement value associated with that piece of information.

15. The apparatus of claim 13, wherein the instructions further cause the processing unit to:
responsive to the document being paused by a program executing the document, further enlarge the selection region associated with each piece of information of the one or more pieces of information during analysis of the document by a third predetermined size amount thereby forming a new region enlargement value for each piece of information of the one or more pieces of information identified during the analysis of the document; and
record the new region enlargement value for each piece of information of the one or more pieces of information identified during the analysis of the document.

16. The apparatus of claim 13, wherein the instructions further cause the processing unit to:
further enlarge the selection region associated with each piece of information of the one or more pieces of information not currently displayed on the screen and associated with each piece of information of the one or more pieces of information currently displayed on the screen by the second predetermined size amount thereby forming a new region enlargement value for each piece of information of the one or more pieces of information not currently displayed on the screen and associated with each piece of information of the one or more pieces of information currently displayed on the screen; and
record the new region enlargement value for each piece of information of the one or more pieces of information currently displayed on the screen.

17. The apparatus of claim 13, wherein the instructions further cause the processing unit to:
responsive to the document being closed, erode the region enlargement value associated with each piece of information of the one or more pieces of information by a predetermined eroding amount.

* * * * *